(12) United States Patent
Cheung et al.

(10) Patent No.: US 6,479,594 B1
(45) Date of Patent: Nov. 12, 2002

(54) SULFONATED SUBSTANTIALLY RANDOM INTERPOLYMERS, BLENDS THEREWITH AND ARTICLES MADE THEREFROM

(75) Inventors: Yunwa W. Cheung, Lake Jackson, TX (US); Stephen F. Hahn, Midland, MI (US); James C. Stevens, Richmond, TX (US); Francis J. Timmers, Midland, MI (US); Gregory F. Schmidt, Kennett Square, PA (US); Thoi H. Ho, Lake Jackson, TX (US); Robert H. Terbrueggen, South Pasadena, CA (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/529,903

(22) PCT Filed: Oct. 21, 1998

(86) PCT No.: PCT/US98/22299

§ 371 (c)(1), (2), (4) Date: Apr. 20, 2000

(87) PCT Pub. No.: WO99/20691

PCT Pub. Date: Apr. 29, 1999

Related U.S. Application Data

(60) Provisional application No. 60/062,873, filed on Oct. 2, 1997.

(30) Foreign Application Priority Data

Oct. 21, 1998 (US) ............................... PCT/US98/22299

(51) Int. Cl.$^7$ .............................. C08F 8/36; C08L 25/00
(52) U.S. Cl. .................................. 525/333.5; 525/332.9
(58) Field of Search ............................. 525/333.5, 332.9

(56) References Cited

U.S. PATENT DOCUMENTS 2,809,960 A * 10/1957 Roth ........................... 525/344
2,945,842 A * 7/1960 Eichhorn ..................... 525/344
3,870,841 A  3/1975 Makowski et al.

FOREIGN PATENT DOCUMENTS

EP  0 487 278 A2  5/1992  ............. C08F/8/00

OTHER PUBLICATIONS

International Search Report dated Mar. 19, 1999 issued by the EPO acting as the International Searching Authority in PCT/US98/22299.

* cited by examiner

*Primary Examiner*—Christopher Henderson

(57) ABSTRACT

Sulfonated substantially random interpolymers made from monomer components comprise from 1 to 65 mole percent of (a) at least one vinyl or vinylidene aromatic monomer, or (b) at least one hindered aliphatic or cycloaliphatic vinylidene monomer, or (c) a combination of at least one vinyl or vinylidene aromatic monomer and at least one hindered aliphatic or cycloaliphatic vinylidene monomer, and from 35 to 99 mole percent of at least one aliphatic α-olefin having from 2 to 20 carbon atoms; and optionally, from 0 to 20 mole percent of a diene containing from 4 to 20 carbon atoms; wherein the sulfonated interpolymer contains at least one mer (or moiety) of a group represented by the formula —$SO_3^-M$ where M is hydrogen or a group 1, 7 or 12 metal in ionic form or combination thereof. Blends of these polymers with polyamides and polyolefins are made.

7 Claims, No Drawings

SULFONATED SUBSTANTIALLY RANDOM INTERPOLYMERS, BLENDS THEREWITH AND ARTICLES MADE THEREFROM

This application claims benefit of provisional Appln. No. 60/062,873 Oct. 2, 1997.

The present invention pertains to sulfonated interpolymers of α-olefin/vinyl or vinylidene aromatic monomers or hindered aliphatic or cycloaliphatic vinylidene monomers or a combination thereof; salts thereof; and blends thereof. The preferred sulfonated interpolymer is a sulfonated substantially random ethylene/styrene interpolymer.

Interpolymers of α-olefin/vinyl or vinylidene aromatic monomer or hindered aliphatic or cycloaliphatic vinylidene monomer or a combination thereof are well known as described by Stevens et al. in EP 0 416 815 A2. Also well known are polyamide polymers and polymers and copolymers of α-olefins.

It is often desirable to prepare blends of polymers so as to obtain a polymeric blend which provides properties or characteristics not available from either of the polymers alone. Such is true of blends of polyamides and polymers and copolymers of α-olefins. However, such polymers are incompatible and a suitable compatibilizer must be employed before the blends can be utilized.

It has now been found that sulfonated interpolymers of α-olefin/vinyl or vinylidene aromatic monomers or hindered aliphatic or cycloaliphatic vinylidene monomers or a combination thereof and salts thereof are suitable compatibilizers for blends of polyamides and polymers and copolymers of α-olefins. The interpolymers containing the sulfonated salts provide improved mechanical properties at elevated temperatures as compared to the interpolymers prior to being sulfonated and subsequently converted to the salt.

SUMMARY OF THE INVENTION

One aspect of the present invention pertains to a surface sulfonated article prepared from a substantially random interpolymer comprising:

(1) from 1 to 65 mole percent of polymer units derived from (a) at least one vinyl or vinylidene aromatic monomer, or (b) a combination of at least one vinyl or vinylidene aromatic monomer containing an aromatic ring Ar, and at least one hindered aliphatic or cycloaliphatic vinylidene monomer; and (2) from 35 to 99 mole percent of polymer units derived from at least one aliphatic α-olefin having from 2 to 20 carbon atoms; and (3) from zero to 20 mole percent of polymer units derived from a diene containing from 4 to 20 carbon atoms; and wherein from 0.001 to 30 mole percent of the polymer units contained in said interpolymer contains one or more groups represented by the formula —$SO_3^-$M where M is hydrogen, $NH_4^+$ or a group 1, 2, 7, 11 or 12 metal in ionic form.

Another aspect of the present invention pertains to a substantially random interpolymer having a sulfonated aromatic or cycloaliphatic ring or a sulfonated polymer backbone or a combination thereof, wherein the interpolymer is made from monomer components comprising:

(1) from 1 to 65 mole percent of (a) at least one vinyl or vinylidene aromatic monomer, or (b) a combination of at least one vinyl or vinylidene aromatic monomer and at least one hindered aliphatic or cycloaliphatic vinylidene monomer; and (2) from 35 to 99 mole percent of at least one aliphatic (α-olefin having from 2 to 20 carbon atoms; and (3) optionally, from zero to 20 mole percent of a diene containing from 4 to 2 carbon atoms; and wherein from 0.1 to 65 mole percent of the aromatic or cycloaliphatic rings contained in said sulfonated interpolymer contains a group represented by the formula —$SO_3^-$M where M is hydrogen, $NH_4^+$ or a group 1, 2, 7, 11 or 12 metal in ionic form.

Another aspect of the present invention pertains to a compatibilized blend of polymers comprising (A) from 1 to 99 percent by weight of at least one polyamide;

(B) from 1 to 99 percent by weight of at least one olefin polymer free of mers derived from aromatic vinyl, aromatic vinylidene, hindered aliphatic vinylidene, cycloaliphatic vinylidene monomers or a combination thereof; and (C) from 1 to 99 percent by weight of at least one ring sulfonated substantially random interpolymer made from monomer components comprising (1) from 1 to 65 mole percent of (a) at least one vinyl or vinylidene aromatic monomer, or (b) a combination of at least one vinyl or vinylidene aromatic monomer and at least one hindered aliphatic or cycloaliphatic vinylidene monomer, and (2) from 35 to 99 mole percent of at least one aliphatic α-olefin having from 2 to 20 carbon atoms; and (3) optionally, from zero to 20 mole percent of a diene containing from 4 to 20 carbon atoms; and wherein from 0.05 to 30 mole percent of the aromatic or cycloaliphatic rings contained in said sulfonated interpolymer contains one or more groups represented by the formula —$SO_3^-$M where M is hydrogen, $NH_4^+$ or a group 1, 2, 7, 11 or 12 metal in ionic form or combination thereof.

Another aspect of the present invention pertains to a modified interpolymer composition having an upper service temperature at least 5° C., preferably from 20° C. to 50° C., more preferably from 50° C. to 150° C. higher than the unmodified interpolymer, said unmodified interpolymer comprising (A) from 1 to 65 mole percent of polymer units derived from at least one vinyl or vinylidene aromatic monomer; and (B) from 35 to 99 mole percent of polymer units derived from at least one aliphatic α-olefin having from 2 to 20 carbon atoms;

said modified polymer resulting from (1) subjecting said unmodified interpolymer to sulfonation so as to provide the resultant sulfonated interpolymer with from 0.1 to 5 weight percent —$SO_3$H groups; and (2) reacting the sulfonated interpolymer of step (1) with a $NH_4^+$ or a Group 1, 2, 7 or 12 metal compound capable of reacting with the product from step (1) to convert at least some, preferably from 1 to 100, more preferably from 50 to 100 mole percent, most preferably 100 mole percent of the pendant —$SO_3$H groups to —$SO_3^-$M groups wherein M is $NH_4^+$ or a Group 1, 2, 7, 11 or 12 metal in ionic form.

In the above compositions, the total number of monomer units in the polymers is 100 mole percent and the total polymer content of the blends is 100 percent by weight.

The blends of the present invention can comprise, consist essentially of, or consist of any two or more of such interpolymers, polymers or copolymers enumerated herein. Likewise, the interpolymers, polymers or copolymers include those made from monomer components which comprise, consist essentially of, or consist of any two or more of the enumerated polymerizable monomers.

DETAILED DESCRIPTION OF THE INVENTION

Any reference herein to metals of a particular group refers to the "Fnew" groups of the periodic table of the elements set forth in the *CRC Handbook of Chemistry and Physics*, 71st ed.

The term "hydrocarbyl" means any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "interpolymer" is used herein to indicate a polymer wherein at least two different monomers are polymerized to form the interpolymer. This includes copolymers, terpolymers, etc.

The term "mer(s)" means the polymerized unit of the polymer derived from the indicated monomer(s).

The term "plurality" as used herein means two or more.

When references are made herein to a polymer containing monomer(s) or monomer units derive from, it really means that the polymer contains monomer(s) residues resulting from polymerizing the indicated monomer(s) to make the polymer.

The term "substantially random" in the substantially random interpolymer comprising an α-olefin and a vinyl or vinylidene aromatic monomer or hindered aliphatic vinylidene monomer as used herein means that the distribution of the monomers of said interpolymer can be described by the Bernoulli statistical model or by a first or second order Markovian statistical model, as described by J. C. Randall in *POLYMER SEQUENCE DETERMINATION, Carbon 13 NMR Method*, Academic Press New York, 1977, pp. 71–78. Preferably, the substantially random interpolymer comprising an (α-olefin and a vinyl or vinylidene aromatic monomer does not contain more than 15 percent of the total amount of vinyl or vinylidene aromatic monomer in blocks of vinyl or vinylidene aromatic monomer of more than 3 units. More preferably, the interpolymer was not characterized by a high degree of either isotacticity or syndiotacticity. This means that in the 13C-NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, and time is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

In the modified polymers of the present invention from 0.001 to 100, preferably from 0.01 to 10, more preferably from 0.05 to 5 mole percent of the aromatic or cycloaliphatic groups contained in the polymer contain a —SO$_3$M group where M is hydrogen, NH$_4^+$ or a metal from Group 1, 2, 7, 11 or 12 of the periodic table of the elements. For pellet anti-blocking, 0.05 to 1 mole percent is preferred. For upper service temperature, 0.1 to 5 weight percent is preferred with 0.2 to 2.5 weight percent being most preferred. For compatibilization, from 0.05 to 20 mole percent is preferred.

The interpolymers suitable for sulfonation to make the sulfonated polymers of the present invention include, but are not limited to, substantially random interpolymers prepared by polymerizing one or more α-olefin monomers with one or more vinyl or vinylidene aromatic monomers, or one or more hindered aliphatic or cycloaliphatic vinylidene monomers, or a combination thereof, and optionally with other polymerizable ethylenically unsaturated monomer(s).

Suitable α-olefin monomers include for example, α-olefin monomers containing from 2 to 20, preferably from 2 to 12, more preferably from 2 to 8 carbon atoms. Preferred such monomers include ethylene, propylene, butene-1, 4-methyl-1-pentene, hexene-1 and octene-1. Most preferred are ethylene or a combination of ethylene with C$_{2-8}$ α-olefins. These α-olefins do not contain an aromatic mer.

Suitable vinyl or vinylidene aromatic monomers which can be employed to prepare the interpolymers employed in the blends include, for example, those represented by the following formula:

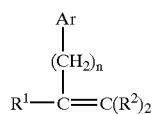

wherein R$^1$ is selected from the group of radicals consisting of hydrogen and alkyl radicals containing from 1 to 4 carbon atoms, preferably hydrogen or methyl; each R$^2$ is independently selected from the group of radicals consisting of hydrogen and alkyl radicals containing from 1 to 4 carbon atoms, preferably hydrogen or methyl; Ar is a phenyl group or a phenyl group substituted with from 1 to 5 substituents selected from the group consisting of halo, C$_{1-4}$-alkyl, and C$_{1-4}$-haloalkyl; and n has a value from zero to 4, preferably from zero to 2, most preferably zero. Exemplary vinyl or monovinylidene aromatic monomers include styrene, vinyl toluene, α-methylstyrene, t-butyl styrene, chlorostyrene, including all isomers of these compounds. Particularly suitable such monomers include styrene and lower alkyl- or halogen-substituted derivatives thereof. Preferred monomers include styrene, a-methyl styrene, the lower alkyl- (C$_1$-C$_4$) or phenyl-ring substituted derivatives of styrene, such as for example, ortho-, meta-, and para-methylstyrene, the ring halogenated styrenes, para-vinyl toluene or mixtures thereof. A more preferred aromatic monovinylidene monomer is styrene.

By the term "hindered aliphatic or cycloaliphatic vinylidene compounds", it is meant addition polymerizable vinylidene monomers corresponding to the formula:

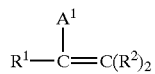

wherein A$^1$ is a sterically bulky, aliphatic or cycloaliphatic substituent of up to 20 carbons, R$^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. α-Olefin monomers containing from 2 to 20 carbon atoms and having a linear aliphatic structure such as propylene, butene-1, hexene-1 and octene-1 are not considered as hindered aliphatic monomers. Preferred hindered aliphatic or cycloaliphatic vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl. Most preferred hindered aliphatic or cycloaliphatic vinylidene compounds are the various isomeric vinyl-ring substituted derivatives of cyclohexene and substituted cyclohexenes, and 5-ethylidene-2-norbornene. Especially suitable are 1-, 3-, and 4-vinyl-cyclohexene.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

The number average molecular weight (Mn) of the polymers and interpolymers is usually greater than 5,000, preferably from 20,000 to 1,000,000, more preferably from 50,000 to 500,000.

Polymerizations and unreacted monomer removal at temperatures above the autopolymerization temperature of the respective monomers may result in formation of some amounts of homopolymer polymerization products resulting from free radical polymerization. For example, while preparing the substantially random interpolymer, an amount of atactic vinyl or vinylidene aromatic homopolymer may be formed due to homopolymerization of the vinyl or vinylidene aromatic monomer at elevated temperatures. The presence of vinyl or vinylidene aromatic homopolymer, in general, is not detrimental for the purposes of the present invention and can be tolerated. The vinyl or vinylidene aromatic homopolymer may be separated from the interpolymer, if desired, by extraction techniques such as selective precipitation from solution with a non solvent for either the interpolymer or the vinyl or vinylidene aromatic homopolymer. For the purpose of the present invention it is preferred that no more than 20 weight percent, preferably less than 15 weight percent based on the total weight of the interpolymers of vinyl or vinylidene aromatic homopolymer is present.

The substantially random interpolymers can be prepared as described in U.S. application Ser. No. 07/545,403 filed Jul. 3, 1990 (corresponding to EP-A-0,416,815) by James C. Stevens et al. and is allowed U.S. application Ser. No. 08/469,828 filed Jun. 6, 1995 now U.S. Pat. No. 5,703,187. Preferred operating conditions for such polymerization reactions are pressures from atmospheric up to 3,000 atmospheres and temperatures from −30° C. to 200° C.

Examples of suitable catalysts and methods for preparing the substantially random interpolymers are disclosed in U.S. application Ser. No. 07/545,403, filed Jul. 3, 1990 corresponding to EP-A-416,815; U.S. application Ser. No. 07/702,475, filed May 20, 1991 abandoned corresponding to EP-A-514,828; U.S. application Ser. No. 07/876,268, filed May 1, 1992 U.S. Pat. No. 5,721,185 corresponding to EP-A-520,732; U.S. application Ser. No. 08/241,523, filed May 12, 1994 U.S. Pat. No. 5,470,993; U.S. Application No. 60/034,819, filed Dec. 19, 1996; as well as U.S. Pat. Nos. 5,055,438; 5,057,475; 5,096,867; 5,064,802; 5,132,380; 5,189,192; 5,321,106; 5,347,024; 5,350,723; 5,374,696; 5,399,635; 5,460,993 and 5,556,928.

Particularly suitable catalysts include, for example, dimethyl[N-(1,1-dimethylethyl)-1,1-dimethyl-1-[(1,2,3,4,5-.eta.)-1,5,6,7-tetrahydro-3-phenyl-s-indacen-1-yl]silanaminato(2-)-N]-titanium and (t-butylamido)dimethyl(tetramethylcyclopentadienyl)silane-titanium (II) 1,3-pentadiene.

The substantially random α-olefin/vinyl or vinylidene aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992).

Also suitable are the substantially random interpolymers which comprise at least one α-olefin/vinyl aromatic/vinyl aromatic/α-olefin tetrad disclosed in U.S. application Ser. No. 08/708,869 filed Sep. 4, 1996 abandoned by Francis J. Timmers et al. These interpolymers contain additional signals with intensities greater than three times the peak to peak noise. These signals appear in the chemical shift range 43.75–44.25 ppm and 38.0–38.5 ppm. Specifically, major peaks are observed at 44.1, 43.9 and 38.2 ppm. A proton test NMR experiment indicates that the signals in the chemical shift region 43.75–44.25 ppm are methine carbons and the signals in the region 38.0–38.5 ppm are methylene carbons.

In order to determine the carbon 13 NMR chemical shifts of the interpolymers described, the following procedures and conditions are employed. A five to ten weight percent polymer solution is prepared in a mixture consisting of 50 volume percent 1,1,2,2-tetrachloroethane-$d_2$ and 50 volume percent 0.10 molar chromium tris(acetylacetonate) in 1,2,4-trichlorobenzene. NMR spectra are acquired at 130° C. using an inverse-gated decoupling sequence, a 90° pulse width and a pulse delay of five seconds or more. The spectra are referenced to the isolated methylene signal of the polymer assigned at 30.000 ppm.

It is believed that these new signals are due to sequences involving two head-to-tail vinyl aromatic monomer preceded and followed by at least one α-olefin insertion, for example, an ethylene/styrene/styrene/ethylene tetrad wherein the styrene monomer insertions of said tetrads occur exclusively in a 1,2 (head-to-tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon 13 NMR peaks but with slightly different chemical shifts.

These interpolymers are prepared by conducting the polymerization at temperatures of from −30° C. to 250° C. in the presence of such catalysts as those represented by the formula

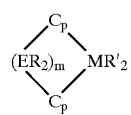

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to 30 preferably from 1 to 20, more preferably from 1 to 10 carbon or silicon atoms; each $R^1$ is independently, each occurrence, H, halo, hydrocarbyl, hyrocarbyloxy, silahydrocarbyl, hydrocarbylsilyl containing up to 30, preferably from 1 to 20, more preferably from 1 to 10 carbon or silicon atoms or two R' groups together can be a $C_{1-10}$ hydrocarbyl substituted 1,3-butadiene; m is 1 or 2; and optionally, but preferably in the presence of an activating cocatalyst. Particularly suitable cocatalysts include, for example ammonium-, sulfonium-, phosphonium-, oxonium-, ferrocenium-, or silylium- salts of tetrakis (pentafluoro-phenyl)borate, tris(pentafluorophenyl)borane, an aluminoxane or trialkylaluminum modified aluminoxane, or a combination thereof.

Particularly, suitable substituted cyclopentadienyl groups include those illustrated by the formula:

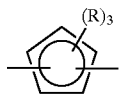

wherein each R is independently, each occurrence, H, hydrocarbyl, silahydrocarbyl, or hydrocarbylsilyl, containing up to 30, preferably from 1 to 20, more preferably from 1 to 10 carbon or silicon atoms or two P groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl)zirconium dichloride, racemic-(dimethylsilanediyl)-bis-(2-methyl-4-phenylindenyl) zirconium 1,4-diphenyl-1,3-butadiene, racemic-(dimethylsilanediyl)-bis-(2-methyl-4-phenylindenyl) zirconium di-$C_{1-4}$ alkyl, racemic-(dimethylsilanediyl)bis(2-methyl-4-phenylindenyl)zirconium di-$C_{1-4}$ alkoxide, or any combination thereof.

Further preparative methods for the interpolymer component (A) of the present invention have been described in the literature. Longo and Grassi (*Makromol. Chem.,* Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints, Am.Chem.Soc., Div.Polym.Chem.*) Volume 35, pages 686,687 [1994]) have reported copolymerization using a $MgCl_2/TiCl_4/NdCl_3/Al$ $(iBu)_3$ catalyst to give random copolymers of styrene and propylene. Lu et al (*Journal of Applied Polymer Science,* Volume 53, pages 1453 to 1460 [1994]) have described the copolymerization of ethylene and styrene using a $TiCl_4/NdCl_3/MgCl_2/Al(Et)_3$ catalyst. Sernetz and Mulhaupt, (*Macromol. Chem. Phys.,* v. 197, pp 1071–1083, 1997) have described the influence of polymerization conditions on the copolymerization of styrene with ethylene using $Me_2Si$ $(Me_4Cp)(N\text{-tert-butyl})TiCl_2$/methylaluminoxane Ziegler-Natta catalysts. The manufacture of α-olefin/vinyl aromatic monomer interpolymers such as propylene/styrene and butene/styrene are described in U.S. Pat. No. 5,244,996, issued to Mitsui Petrochemical Industries Ltd.

The interpolymers which contain hindered cycloaliphatic monomer residues are usually prepared by subjecting an interpolymer containing monovinylidene aromatic monomer residues to hydrogenation thereof converting some or all of the aromatic rings to cycloaliphatic rings which can be saturated (for example, cyclohexane ring) or unsaturated (cyclohexene ring).

The interpolymers of one or more α-olefins and one or more vinyl or monovinylidene aromatic monomers, or one or more hindered aliphatic or cycloaliphatic vinylidene monomers, or a combination thereof, employed in the present invention are substantially random polymers.

These interpolymers usually contain from 0.5 to 65, preferably from 1 to 55, more preferably from 2 to 50 mole percent of at least one vinyl or vinylidene aromatic monomer or hindered aliphatic or cycloaliphatic vinylidene monomer, or a combination thereof, and from 35 to 99.5, preferably from 45 to 99, more preferably from 50 to 98 mole percent of at least one aliphatic α-olefin having from 2 to 20 carbon atoms.

The interpolymers can be sulfonated by any suitable means known in the art for sulfonating aromatic ring compounds. A suitable method is that described by Turbuk in U.S. Pat. No. 3,072,618. The polymer is sulfonated by contacting the polymer with a sulfonating complex comprising the reaction product of 2 to 4 moles of sulfur trioxide and 1 mole of a lower trialkyl phosphate or phosphite at a temperature of from 25° C. to 100° C., preferably from 50° C. to 83° C., more preferably from 75° C. to 83° C. for from a few seconds to several hours followed by recovering the resultant sulfonated polymer. Sulfur trioxide can also be supplied in the form of chlorosulfonic acid or fuming sulfuric acid. Particularly suitable trialkyl phosphates include trimethyl phosphate, triethyl phosphate, tripropyl phosphate, tributyl phosphate, trimethyl phosphite, triethyl phosphite, tripropyl phosphite, tributyl phosphate, hydrogen phosphate, diethyl hydrogen phosphate, dimethyl hydrogen phosphite, diethyl hydrogen phosphite, methyl dihydrogen phosphate, ethyl dihydrogen phosphate, methyl dihydrogen phosphite, ethyl dihydrogen phosphite, any combination thereof.

A particularly preferred method of sulfonation is that described by H. S. Makowski, R. D. Lundberg, and G. H. Singhal in U.S. Pat. No. 3,870,841. In this method, a mixed anhydride prepared by mixing sulfuric acid with acetic anhydride at a temperature of from −70° C. to 130° C. (preferably between −20 and 20° C.) followed by addino this mixture to a solution of the polymer in a chlorinated solvent such as, for example dichloroethane, methylene chloride, chloroform, tetrachloroethane, trichloroethane or combinations thereof at a temperature of from −20° C. to 100° C.

The salts of these sulfonated polymers can be prepared by reacting the sulfonated polymer with a metal salt in a suitable solvent at temperatures of from 20° C. to 100° C., preferably from 40° C. to 100° C., more preferably from 60° C. to 80° C. for a period of time to convert essentially all of the $SO_3H$ groups to the metal salt ($SO_3Me$ where Me is the metal), usually from 0.01 to 240, preferably from 1 to 60, more preferably from 5 to 30 minutes. Me is suitably a group 1, 2, 7, 11 or 12 metal of the Periodic Table of Elements. The amount of the metal salt employed is that which is sufficient to convert substantially all of the sulfonate groups to the metal salt, usually from 1 to 1.5, preferably from 1 to 1.1, more preferably 1 mole of metal salt per mole of sulfonate group present in the polymer. The amount of solvent employed is that amount sufficient to create a substantially homogeneous mixture, which can range from 5 to 95, preferably from 10 to 80, more preferably from 15 to 75 percent by weight based on the combined weight of the mixture.

Suitable metal salts which can be employed herein include the salts formed from group 1, 2, 7, 11 or 12 metals as well as the ammonium ($NH_4^+$) salts and a $C_2$ to $C_{20}$, preferably $C_2$ to $C_{10}$ carboxylic acid. Particularly suitable metals of group 1, 2, 7, 11, or 12 include Na, K, Li, Co, Cu, Mg, Ca, Mn, or Zn. Also suitable are the hydroxides of such metals. Particularly suitable salts and hydroxides include the hydroxides, acetates, hexanoates, and oxides of Na, Li, K, Ca, Mg, Cu, Co, Zn Al, $NH_4+$, and any combination thereof. Also suitable are the hydrates of the aforementioned salts.

Suitable polyamides which can be employed herein as blend component (A) include, for example, polymeric amides prepared both by condensation and ring opening polymerization represented by the following structures:

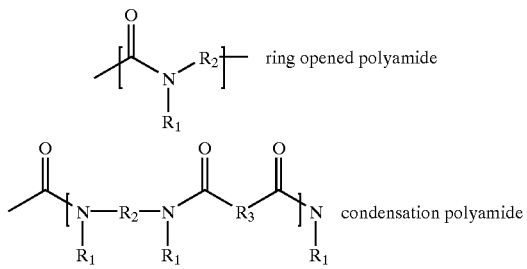

These are often given the common name Nylon. For the ring opened polyamides, $R_1$ is preferably hydrogen, but can be an aliphatic hydrocarbon group. For ring opened polyamides, $R_2$ is an aliphatic hydrocarbon. Ring opened polyamides include polymers such as polyamide 6, where 6 is the number of carbons between N atoms in the main chain ($R_1$=H, $R_2$=5) Materials of this type include nylon 6, nylon 11, and nylon 12.

Polyamides are also prepared by condensation methods, such as the reaction between a diamine and a diacid (or diacid derivative). The structure of materials prepared by this method are designated numerically with the number of carbons between the N atoms from the diamine portion followed by the number of carbon atoms in the diacid portion. For example, the polymer prepared from 1,6-diamino hexane and adipic acid is described as polyamide 66 ($R_1$=H, $R_2$=6, $R_3$=4) or nylon 66. For condensation polyamides, $R_2$ can be a difunctional aliphatic or aromatic group, and $R_3$ can be a difunctional aliphatic or aromatic group. $R_2$ and $R_3$ can be the same or different. Polyamides of this type include polyamide 46, 66, 69, 610, and 612.

Olefinic polymers suitable for use as component (B) in the blends according to the present invention are aliphatic α-olefin homopolymers or interpolymers, or interpolymers of one or more aliphatic α-olefins and one or more non-aromatic monomers interpolymerizable therewith or chlorinated polyethylene (CPE). Preferred olefinic polymers for use in the present invention are homopolymers or interpolymers of an aliphatic, including cycloaliphatic, α-olefin having from 2 to 18 carbon atoms. Suitable examples are homopolymers of ethylene or propylene, and interpolymers of two or more α-olefin monomers. Other preferred olefinic polymers are interpolymers of ethylene and one or more other α-olefins having from 3 to 8 carbon atoms. Exemplary monomers which can be polymerized therewith include 1-butene, 4-methyl-1-pentene, 1-hexene, and 1-octene. The olefinic polymer components (a) may also contain, in addition to the α-olefin, one or more non-aromatic monomers interpolymerizable therewith. Such additional interpolymerizable monomers include, for example, diolefins, ethylenically unsaturated carboxylic acids (both mono- and difunctional) as well as derivatives of these acids, such as esters and anhydrides. Exemplary of such monomers are acrylic acid, methacrylic acid, vinyl acetate and, maleic anhydride. The olefinic polymers can be further characterized by their degree of long or short chain branching and the distribution thereof.

One class of olefinc polymers is generally produced by a high pressure polymerization process using a free radical initiator resulting in the traditional long chain branched low density polyethylene (LDPE) LDPE employed in the present composition usually has a density of less than 0.94 g/cc (ASTM D 792) and a melt index of from 0.01 to 100, and preferably from 0.1 to 50 grams per 10 minutes (as determined by ASTM Test Method D 1238, condition I).

Another class is the linear olefin polymers which have an absence of long chain branching, as the traditional linear low density polyethylene polymers (heterogeneous LLDPE) or linear high density polyethylene polymers (HDPE) made using Ziegler polymerization processes (for example, U.S. Pat. No. 4,076,698 (Anderson et al.), sometimes called heterogeneous polymers.

HDPE consists mainly of long linear polyethylene chains. The HDPE employed in the present composition usually has a density of at least 0.94 grams per cubic centimeter (g/cc) as determined by ASTM Test Method D 1505, and a melt index (ASTM-1238, condition I) in the range of from 0.01 to 100, and preferably from 0.1 to 50 grams per 10 minutes.

The heterogeneous LLDPE employed in the present composition generally has a density of from 0.85 to 0.94 g/cc (ASTM D 792), and a melt index (ASTM-1238, condition I) in the range of from 0.01 to 100, and preferably from 0.1 to 50 grams per 10 minutes. Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1 octene.

A further class s that of the uniformly branched or homogeneous polymers (homogeneous LLDPE). The homogeneous polymers contain no long chain branches and have only branches derived from the monomers (if having more than two carbon atoms). Homogeneous polymers include those made as described in U.S. Pat. No. 3,645,992 (Elston), and those made using so-called single site catalysts in a batch reactor having relatively high olefin concentrations (as described in U.S. Pat. Nos. 5,026,798 and 5,055,438 (Canich). The uniformly branched/homogeneous polymers are those polymers in which the comonomer is randomly distributed within a given interpolymer molecule and wherein the interpolymer molecules have a similar ethylene/comonomer ratio within that interpolymer.

The homogeneous LLDPE employed in the present composition generally has a density of from 0.85 to 0.94 g/cc (ASTM D 792), and a melt index (ASTM-1239, condition 7) in the range of from 0.01 to 100, and preferably from 0.1 to 50 grams per 10 minutes. Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

Further, there is the class of substantially linear olefin polymers (SLOP) that may advantageously be used in component (a) of the blends of the present invention. These polymers have a processability similar to LDPE, but the strength and toughness of LLDPE. Similar to the traditional homogeneous polymers, the substantially linear ethylene/α-olefin interpolymers have only a single melting peak, as opdosed to traditional Ziegler polymerized heterogeneous linear ethylene/α-olefin interpolymers which have two or more melting peaks (determined using differential scanning calorimetry). Substantially linear olefin polymers are disclosed in U.S. Pat. Nos. 5,272,236, 5,278,272 and 5,665, 800.

The density of the SLOP as measured in accordance with ASTM D-792 is generally from 0.85 g/cc to 0.97 g/cc, preferably from 0.85 gicc to 0.955 g/cc, and especially from 0.85 g/cc to 0.92 g/cc.

The melt index ($I_2$), according to ASTM D-1238, Condition 190° C./2.16 kg (also known as $I_2$), of the SLOP is generally from 0.01 g/10 min. to 1000 g/10 min., preferably from 0.01 g/10 min. to 100 g/10 min., and especially from 0.01 g/10 min. to 10 g/10 min.

Also, included are the ultra low molecular weight ethylene polymers and ethylene/α-olefin interpolymers which have $I_2$ melt indices greater than 1,000, or a number average molecular weight (Mn) less than 11,000.

The SLOP can be a homopolymer of $C_2$–$C_{20}$ olefins, such as ethylene, propylene, 4-methyl-1-pentene, etc., or it can be an interpolymer of ethylene with at least one $C_3$–$C_{20}$ α-olefin or $C_2$–$C_{20}$ acetylenically unsaturated monomer or $C_4$–$C_{18}$ diolefin, or a combination thereof. SLOP can also be an interpolymer of ethylene with at least one of the above $C_3$–$C_{20}$ α-olefins, diolefins or acetylenically unsaturated monomers, or a combination thereof, in combination with other unsaturated monomers.

Especially preferred olefin polymer components (a) comprise LDPE, HDPE, heterogeneous and homogeneous LLDPE, SLOP, polypropylene (PP), especially isotactic polypropylene and rubber toughened polypropylenes, or ethylene-propylene interpolymers (EP), or chlorinated polyolefins (CPE), or any combination thereof.

The blends of the present invention usually comprise from 1 to 99, preferably from 50 to 95 and more preferably from 70 to 85 percent by weight of component (A); from 1 to 99, preferably from 5 to 50 and more preferably from 15 to 30 percent by weight of component (B); and from 0.1 to 99, preferably from 0.1 to 20 and more preferably from 1 to 10 percent by weight of component (C). The percentages are based on the total amount of the polymers constituting the blends and the blends comprise a total amount of 100 percent by weight of components (A), (B) and (C).

The blends of the present invention may be prepared by any suitable means known in the art such as, but not limited to, dry blending in a pelletized form in the desired proportions followed by melt blending, for example, in a screw extruder, Herschel mixer, or Banbury mixer. The dry blended pellets may be directly melt processed into a final solid state article by for example injection molding. Alternatively, the blends may be made by direct polymerization, without isolation of the blend components, using for example one or more catalysts in one reactor or two or more reactors in series or parallel.

Additives such as antioxidants (for example, hindered phenols such as, for example, IRGANOX® 1010), phosphites (for example, IRGAFOS® 168)), U. V. stabilizers, cling additives (for example, polyisobutylene ), antibiock additives, colorants, pigments, and fillers can also be included in the interpolymers employed in the blends of the present invention, to the extent that they do not interfere with the enhanced properties discovered by Applicants.

The additives are employed in functionally equivalent amounts known to those skilled in the art. For example, the amount of antioxidant employed is that amount which prevents the polymer or polymer blend from undergoing oxidation at the temperatures and environment employed during manufacture, storage and ultimate use of the polymers. Such amounts of antioxidants is usually in the range of from 0.05 to 10, preferably from 0.1 to 5, more preferably from 0.1 to 2 percent by weight based upon the weight of the polymer or polymer blend.

Similarly, the amounts of any of the other enumerated additives are the functionally equivalent amounts such as the amount to render the polymer or polymer blend antiblocking, to produce the desired amount of filler loading to produce the desired result, to provide the desired color from the colorant or pigment, etc. Such additives can typically be employed in the range of from 0.05 to 50, preferably from 0.1 to 35, more preferably from 0.2 to 20 percent by weight based upon the weight of the polymer or polymer blend. However, in the instance of fillers, they could be employed up to 90 percent by weight based upon the weight of the polymer or polymer blend.

The blends of the present invention can be utilized to produce a wide range of fabricated articles such as, for example but not limited to, calendered sheet, blown films and injection molded parts. The blends can also be used in the manufacture of fibers, foams and lattices. The blends of the present invention can also be utilized in adhesive formulations.

The surface sulfonated articles of the present invention can be used in a wide range of applications such as to give polymer pellets which possess improved material handling characteristics as demonstrated by a decrease in the tendency of the pellets to stick together. Surface sulfonation can also be used to improve the solvent resistance of molded parts in applications such as, for example, automotive parts. The surface sulfonation can also be used to improve part paintability, improve the adhesion of parts to polar substrates such as, for example, glass, metal, and polar polymers, and improve the barrier properties of articles to gases. A further application is to decrease the tackiness of molded parts, so as to decrease the tendency of films and molded parts to stick together.

The randomly sulfonated interpolymers of the present invention can be utilized to produce a wide range of fabricated articles such as, for example but not limited to, calendered sheet, blown films and injection molded parts. They can be used as third component blend compatibilizers in polyolefin/polyester or nylon blends. Randomly sulfonated samples can also be used to give polymers with improved compatibility with polar materials such as, for example, asphalt. Randomly sulfonated samples also display improved temperature resistance compared to unsulfonated samples which allows them to be used in high heat applications. Randomly sulfonated samples can be used as high heat elastomers. Sulfonated samples may also be more susceptible to sealing by radio frequency (RF) treatments.

The following examples are illustrative of the invention, but are not to be construed as to limiting the scope of the invention in any manner.

Test Methods

The following test methods were employed.

The Shear Storage Modulus (G') was determine with a Rheometrics Inc. RDA-II dynamic mechanical spectrometer was used to obtain DMS data. A temperature sweep was run from approximately –70° C. to 200° C. at 5° C./step with 30 s equilibration delay at each step. The oscillatory frequency was 1 radian/s with an autostrain function of 0.1 percent strain initially, increasing in positive 100 percent adjustments whenever the torque decreased to 4 g-cm. The maximum strain was set at 26 percent. The 7.9-mm parallel plate fixtures were used with an initial gap of 1.5 mm at 160° C. (the sample was inserted into the RDA-II at 160° C.). The "Hold" function was engaged at 160° C. and the instrument was cooled to −70° C. and the test started. (The Hold function corrects for the thermal expansion or contraction as the test chamber is heated or cooled.) A nitrogen environment was maintained throughout the experiment to minimize oxidative degradation.

The Extent of Sulfonation was determined by elemental analysis or X-ray fluorescence spectroscopy. Ion chromatography was used to determine the sulfur content in the sample. The sulfur content was performed by combustion of the polymer to convert any sulfur in the sample to sulfate, and sulfate was quantified using Ion chromatography (IC). Li content was assessed by first digesting the sample in a sulfuric acid/hydrogen peroxide mixture, and quantifying the Li content by flame-atomic absorption (Flame-AA) analysis.

Determination of Percent Sulfur by X-ray Fluorescence Spectroscopy

The weight percent of sulfur in the ESI samples was determined by x-ray fluorescence spectroscopy. All measurements were performed using Philips PW1480 wavelength dispersive X-ray spectrometer. This instrument is equipped with scandium/molybdenum X-ray tube. All measurements were carried out in a helium atmosphere. The samples were hot pressed into disc and placed into XRF cups with a 6.3 micron polypropylene film. The cup was covered with a microporous film. The cups and film were obtained from Chemplex Industries, Inc. The measurements for sulphur were made in triplicate on the sulphur channel. The intensities were averaged for the fundamental parameters analysis. A water blank was measured to correct for scatter and film contamination. The total sulphur was quantified using fundamental parameters (FP) analysis. A 1 percent certified sulphur standard in water or 0.5 percent sulphur standard in base oil was used for quantitation. A PC version of fundamental parameters program, PCFPW, was used for calculations.

Determination of the Concentration of Sulfur at the Surface of ESI Pellets by X-ray Photoelectron Spectroscopy (XPS)

Pieces of the sample pellets were mounted on a sample holder, using double sided tape. The surface and bulk of the pellets were analyzed. X-ray photoelectron spectroscopy (XPS) was performed on a Physical Electronics (PHI) 5600 system. The Al $K_\alpha$ monochromated x-ray source (1486.6 eV) was operated at 250 W and power regulated at 14 kV. An 800×2000 μm analysis area was used with the samples mounted at a 68° photoelectron take-off angle relative to the sample surface. Sample charging was minimized using an electron flood gun, and spectra were charge referenced using the C 1s peak at 284.8 eV. Spectra were recorded with the collection optics in "minimum area mode" with a photoelectron solid collection angle of ±7°.

The pass energy and step size (in eV) were 93.9/0.4 for survey spectra. Other collection parameters were recorded electronically with the spectra. All spectral manipulation was done with the PHI-ACCESS software, revision 5.4B. Peak areas were measured using an integrated background elemental sensitivity factors provided in the software were used to calculate atomic percentages. The detection limit is ~0.05 atomic percent.

Measurement of Surface Contact Angle of Water (pH 7) on ESI Sample Plaques

Contact angle measurements were taken using a Kernco model G-II goniometer (Kernco Instruments Co. Inc., 420 Kenazo Street, El Paso, Tex. 79927) which has been upgraded by Kruss USA (9305-B Monroe Road, Charlotte, N.C. 28270). The system is now essentially the Kruss ACAMS-40 automated contact angle measuring system. The sample is illuminated with a fiber-optic light source and the droplet image is displayed on a video monitor. The image is displayed on the computer screen using Kruss G40 software and contact angle measurements are obtained by digital integration of the video image. A water droplet is applied to compression molded sample plaque using a micro-syringe, and the droplet volume is approximately 0.4 microliters. The contact angle measurements were obtained by following the procedures described in the operating procedure for The Contact Angle Measuring System G40 as supplied by Kruss USA.

Determination of the Blocking Tendency of ESI Pellets

ESI sample pellets (125 grams-enough to fully fill the cylinder) were loaded into a stain-less steel cylinder (120 mm×52 mm dia.). The cylinders were constructed by cutting a stainless steel pipe in half (length wise) and the two halves of the cylinder were held together by a clamp. The cylinders were lined with TEFLON™ coated paper. The filled cylinders were loaded into a sample rack and a guided piston was placed on top of the pellets in the cylinder. The diameter of the foot of the piston was 50 mm. The weight of the piston was 1.9 lb, and a 5.0 lb, weight was placed onto the top of the piston head to yield a total force of 6.9 lb. The samples were loaded into the oven and the samples were compacted at 45° C. for 24 hours. After 24 hours, the samples were removed from the oven. The sample weights were then removed, and the samples were allowed to cool to room temperature (at least 1 hour). The cylinder was then carefully disassembled.

The resulting polymer pucks which were generated by overnight compaction (usually about 50 mm in diameter× 75–100 mm in height) were compressed between two flat plates using a Instru-Met/Sintech computer-controlled Instron equipped with a compression load cell. The Instron was run in compression mode at a rate of 1 mm/min. The pucks were compressed until the pellet cylinder failed, or until either a force of 100 lbs or a percent strain of 50 percent was reached. The force required to achieve cylinder failure was recorded.

DSC (Differential Scanning Calorimetry) data were obtained using a Perkin-Elmer DSC-7. Samples were melt-pressed into thin films and put in aluminum pans. The samples were heated to 180° C. in the DSC and kept there for 4 min to ensure complete melting. The samples were then cooled at 10° C./min to −30° C. and heated to 140° C. at 10° C./min.

Dynatup, an indication of fracture toughness, was determined by ASTM D-3763-86.

UST (upper service temperature) was determined using a Perkin Elmer model TMA 7 thermomechanical analyzer. Probe force of 102 g and heating rate of 5° C./min were used. The penetration of the probe to the sample as a function of temperature was measured. The UST is defined as the temperature at which the penetration is 1 mm. Test specimen was a disk with thickness of about 2 mm and diameter of about 5 mm, prepared by melting pressing at 205° C. and air-cooling to room temperature.

Tensile properties were determined by ASTM D638 at a testing speed of 0.2 in/min.

Dynatup impact was determined by ASTM D3763-86.

Izod Impact (notched) was determined by ASTM 256-81.

The Crystalline Melting Point (Tm); Glass Transition temperature (Tg); and Crystallinity was determined by differential scanning calorimetry (DSC). The samples were heated at a rate of 10° C./minute and the crystalline melting point was observed as an endothermic peak, for which a peak melting pint was recorded. Integration of the energy under this peak was compared to that known for 100 percent crystalline base polymer (polyamide 6, 100 J/g; polyethylene, 277 J/g; polylpropylene, 209 J/g. Glass transition temperatures were observed as deflections in the heat flow response, and the glass transition temperature was recorded as the midpoint of the heat flow curve.

Melt Temperature, Tm, is the same as the crystalline melting point.

Scanning Electron Microscopy data was determined by the following procedure. Injection Molded tensile specimens were notched with a razor blade and subsequently immersed in liquid nitrogen. Samples were then fractured in a compact tension mode. Freeze-fracture morphology of palladium coated samples was examined with a Hitachi S-400 SEM operating at 10 KV. Digital image analysis was performed on a series of micrographs to determine particle size and particle size distribution.

EXAMPLE 1

A. Preparation of Ethylene/Octene/Styrene (EOS) Interpolymer (57.9/27.5/14.6 wt. percent E/S)

Ethylene/1-octene/styrene interpolymers were made using (tert-butylamido)di-methyl(tetramethyl-h$^5$-cyclopentadienyl)silane dimethyltitanium(+4) catalyst and tris(pentafluorophenyl)borane cocatalyst in a one to one ratio according to the following general procedure. A two liter stirred reactor was charged with the desired amounts of mixed alkane solvent (ISOPAR™-E available from Exxon Chemicals Inc.), styrene monomer 1-octene monomer. Hydrogen was then added to the reactor by differential pressure expansion (pressure difference indicated by delta) from a 75 mL addition tank. The contents of the reactor were heated to the desired temperature followed by saturation with ethylene at the desired pressure. The desired quantities of catalyst and cocatalyst were mixed in toluene and the resulting solution was transferred to a catalyst addition tank and injected into the reactor.

Polymerization was allowed to proceed with ethylene on demand. Additional charges of catalyst and cocatalyst, if used, were prepared in the same manner and were added to the reactor periodically. After the run time, the polymer solution was removed from the reactor and quenched with isopropyl alcohol. A hindered phenol antioxidant (IRGANOX™ 1010 available from Ciba Geigy Corp.) was added to the polymer solution. Volatiles were removed from the polymers in a vacuum oven set at 120° C. for about 20 hours. The substantially random interpolymers were found to contain small amounts of amorphous polystyrene homopolymer.

Preparation Conditions for the Substantially Random E/O/S Interpolymers

| Polymer Designation | Isopar-E (g) | Styrene (g) | Ethylene (MPa) | Octene (g) | H$_2$ (ΔMPa) | Temp. (° C.) | Time (min.) | Cat. (μmol) | Antioxidant (g) | Yield (g) |
|---|---|---|---|---|---|---|---|---|---|---|
| EOS-1 | 221 | 458 | 2.76 | 137 | 0.36 | 80 | 15 | 2.0 | | 108 |
| EOS-2 | 239 | 461 | 2.07 | 103 | 0.36 | 80 | 15 | 2.0 | | 64.9 |

The properties of the EOS polymers EOS-1 and EOS-2 are given in Table 1.

B. Sulfonation of Example 1A (SEOS-1)

50 g EOS-1 was dissolved in 500 mL dichloroethane in a 1 liter flask, and the mixture was heated to 83° C. until the polymer was swollen, and 100 mL of cyclohexane was then added. The sulfonating agent was prepared by cooling 100 mL dichloroethane in an ice bath and adding 7 mL of 95 percent sulfuric acid and 23 mL acetic anhydride to it. 70 mL of this sulfonating agent was added to the flask, and the reaction was allowed to proceed at reflux for 3.5 hours. This polymer was precipitated into 2 L of methanol and was washed further with methanol. The polymer was redissolved in 900 mL methanol; 40 mL of this solution was set aside for further analysis, and the remaining polymer was neutralized with 50 mL of a 1.44 M methanolic LiOH solution for 3 hours at 70° C. This polymer was then washed with precipitated from 2 L methanol and washed with methanol. Elemental analysis for sulfur gave 0.12 percent, or 2.7 mole percent sulfonation. Elemental analysis for lithium gave 0.056 weight percent, or 5.8 mole percent. This sulfonated polymer is hereafter referred to as SEOS-1.

C. Sulfonation of Example 1A (SEOS-2)

Same procedure as employed above for sulfonating EOS-1 employing the following: 50 g polymer (EOS-2), 500 mL dichloroethane, 50 mL cyclohexane, 80 mL sulfonating agent. The reaction was terminated with 50 mL of 2-propanol. Neutralized with 70 mL of a 1.517 M methanolic LiOH solution. Sulfur analysis: 3.3 mole percent sulfonation. Li analysis: 2.6 mole percent Lithium. This sulfonated polymer is hereafter referred to as SEOS-2.

D. Preparation of Ethylene/Styrene Interpolymer (ES-1) (51.7/48.3 wt. Percent ES)

Ethylene/styrene copolymer was prepared in a 400 gallon agitated semi-continuous batch reactor. The reaction mixture consisted of approximately 250 gallons a solvent comprising a mixture of cyclohexane (85 wt. percent) and isopentane (15 wt.), and styrene. Prior to addition, solvent, styrene and ethylene were purified to remove water and oxygen. The inhibitor in the styrene was also removed. Inerts were removed by purging the vessel with ethylene. The vessel was then pressure controlled to a set point with ethylene. Hydrogen was added to control molecular weight. Temperature in the vessel was controlled to set-point by varying the jacket water temperature on the vessel. Prior to polymerization, the vessel was heated to the desired run temperature and the catalyst components Titanium: (N-1,1-dimethylethyl) dimethyl(1-(1,2,3,4,5-eta)-2,3,4,5-tetramethyl-2,4-cyclopentadien-1-yl) silanaminato))(2-)N)-dimethyl, CAS# 135072-62-7 and Tris(pentafluorophenyl)boron, CAS# 001109-15-5, Modified methylaluminoxane Type 3A, commercially available from CAS# 146905-79-5 were flow controlled, on a mole ratio basis of 1/3/5 respectively, combined and added to the vessel. After starting, the polymerization was allowed to proceed with ethylene supplied to the reactor as required to maintain vessel pressure. In some cases, hydrogen was added to the headspace of the reactor to maintain a mole ratio with respect to the ethylene concentration. At the end of the run, the catalyst flow was stopped, ethylene was removed from the reactor, and about 1000 ppm of IRGANOX™ 1010 anti-oxidant was then added to the solution and the polymer was isolated from the solution. The resulting polymers were isolated from solution by either stripping with steam in a vessel or by use of a devolatilizing extruder. In the case of the steam stripped material, additional processing was required in extrusion equipment to reduce residual moisture and any unreacted styrene.

agent. The reaction was terminated with 50 mL of 2-propanol. Neutralized with 70 mL of a 1.517 M methanolic LiOH solution. Sulfur analysis: 5.3 mole percent sulfonation. Li analysis: 5.4 mole percent Lithium. This sulfonated polymer Is hereafter referred to as SES-1.

F. Polyamide 6(PA6) (Nylon 6)

This polyamide 6 has a melting point of 222° C. and a percent crystallinity of 30 available from Allied Signal as Capron™ 8207F.

G. Polypropylene (PP)

This polypropylene has a melting point of 165° C. and a percent crystallinity of 46 available from Himont Inc. as PP 6331.

H. Polyethylene (LLDPE)

This linear low density polyethylene has a density of 0.92 g/cc and a melt flow rate of 1.00 g/10 min (ASTM D-1238,

| Sample Number | Solvent loaded lbs | kg | Styrene loaded lbs | kg | Pressure Psig | kPa | Temp. ° C. | Total H$_2$ Added Grams | Run Time Hours | Polymer in Solution Wt. Percent | I$_2$ Melt Index, g/10 min. | Total Weight Percent Styrene Monomer Units in Polymer | Talc Level Wt Percent | Isolation Method |
|---|---|---|---|---|---|---|---|---|---|---|---|---|---|---|
| ES-1 | 841 | 381 | 662 | 300 | 105 | 724 | 60 | 34 | 4.9 | 9.8 | 1.0 | 48.3 | <3.5 | Stm. Str. |

E. Sulfonation of Example 1D (SES-1)

Same procedure as employed above for sulfonating EOS-1 employing the following: 50 g polymer, 500 mL dichloroethane, 50 mL cyclohexane, 80 mL sulfonating condition E, 190° C., and is available from The Dow Chemical Company as Dowlex™ 2045A.

Properties of the polymers employed as compatibilizers for other polymers are given in Table 1.

TABLE 1

| Sample | Polymer | Styrene percent Wt. | Mole | Ethylene Percent Wt. | Mole | Octene Percent Wt. | Mole | Sulfonation[a] Percent wt. | Mole[e] | Tg[b] ° C. | Tm[c] ° C. | Crystallinity[d] Percent |
|---|---|---|---|---|---|---|---|---|---|---|---|---|
| 1 | 1A [EOS-1] | 14.6 | 5.7 | 57.9 | 84.3 | 27.5 | 10.0 | 0.12 | 2.7 | −45 | 53 | 12 |
| 2 | 1B [EOS-2] | 18.5 | 7.2 | 58 | 84.3 | 23.5 | 8.5 | 0.19 | 3.3 | −40 | 48 | 7 |
| 3 | 1C [ES-1] | 48.3 | 20.1 | 51.7 | 79.9 | — | — | 0.85 | 5.3 | −12 | 42 | 5 |

[a]The degree of sulfonation was determined by elemental analysis.
[b]Tg is the glass transition temperature.
[c]Tm is the crystalline melting point.
[d]Percent crystallinity is based on heat of crystallization of 277 J/g for polyethylene.
[e]Mole percent sulfonation is the percent of the aromatic rings which are sulfonated.

Preparation of Blends

Blends of various polymers were prepared by drying the polymers at 80° C. in a vacuum oven for at least 12 hours prior to blending by either a melt blend method or an extrusion method.

Melt Blend Method

About 200 grams of the blend components were first manually mixed and then fed into a 250 cc Haake Buchler Mixer equilibrated at 260° C. and operated at 60 rpm. Feeding an temperature equilibration typically took about 10 min. Once the melt temperature had reached 240° C., mixing was continued for another 3 minutes such that the total residence time in the mixer was about 13 min. The blend samples were reduced to fine particles in a Wiley grinder.

Extrusion Blend Method

About 200 grams of the blend components were first manually mixed and then fed at a rate of 2 lb/hour (0.9072 kg/hour) into a C. W. Brabender 1-inch (2.54-cm) counter-rotating twin screw extruder set at 260° C. and run with a screw speed of 75 rpm. Material The extruded blends were than pelletized for injection molding.

Properties of the various blends are given in Table 2.

TABLE 2

| | BLEND DESIGNATION | | | | | | | | |
|---|---|---|---|---|---|---|---|---|---|
| | * | * | A* | B* | C | D* | E* | F | G |
| BLEND COMPOSITION | | | | | | | | | |
| Polymer A; | | | | | | | | | |
| Type | $1F^a$ | — | $1F^a$ | $1F^a$ | $1F^a$ | $1F^a$ | $1F^a$ | $1F^a$ | $1F^a$ |
| wt. percent | 100 | 0 | 70 | 75 | 75 | 75 | 75 | 75 | 90 |
| Polymer B; | | | | | | | | | |
| Type | — | $1G^b$ | $1G^b$ | $1G^b$ | $1G^b$ | $1H^c$ | $1H^c$ | $1H^c$ | — |
| wt. percent | 0 | 100 | 30 | 20 | 20 | 25 | 20 | 20 | 0 |
| Polymer C; | | | | | | | | | |
| Type | — | — | — | EOS-1 | SEOS-1 | — | ES-1 | SES-1 | SEOS-2 |
| wt. percent | 0 | 0 | 0 | 5 | 5 | 0 | 5 | 5 | 10 |
| Blend Method | — | — | $MB^g$ | $MB^g$ | $MB^g$ | $EB^h$ | $EB^h$ | $EB^h$ | $EB^h$ |
| PROPERTIES | | | | | | | | | |
| Tm (PA6)$^c$, ° C. | 220.7 | — | 220.2 | — | — | 220.2 | 220.2 | 221.1 | — |
| Tm (PO)$^d$, ° C. | — | 165.2 | 163.3 | — | — | — | — | — | — |
| Percent PA XT$^e$ | 30.2 | — | 28.2 | — | — | 33.6 | 31.3 | 31.5 | — |
| Percent PO XT$^f$ | — | 45.5 | 38.3 | — | — | 31.8 | 32.4 | 32.4 | — |

*Not an example of the present invention.
$^a$Polyamide (Nylon 6).
$^b$Polypropylene.
$^c$Linear Low Density Polyethylene.
$^d$Tm (PO) is the melt temperature of the polyolefin phase employed as polymer B.
$^e$Percent crystallinity of the polyamide phase
$^f$Percent crystallinity of the polyolefin phase.
$^g$Melt blend.
$^h$Extrusion blend.

Table 3 gives the size of dispersed particles in the blend as measured by scanning electron microscopy. Injection Molded tensile specimens were notched with a razor blade and subsequently immersed in liquid nitrogen. Samples were then fractured in a compact tension mode. Freeze-fracture morphology of palladium coated samples was examined with a Hitachi S-400 scanning electron microscope (SEM) operating at 10 KV. Digital image analysis was performed on a series of micrographs to determine particle size and particle size distribution.

TABLE 3

| | Blend Designation | | | | | |
|---|---|---|---|---|---|---|
| | A* | B* | C | D* | E* | F |
| BLEND COMPOSITION | | | | | | |
| Polymer A; | | | | | | |
| Type | $1F^a$ | $1F^a$ | $1F^a$ | $1F^a$ | | $1F^a$ |
| wt. percent | 70 | 75 | 75 | 75 | 75 | 75 |
| Polymer B; | | | | | | |
| Type | $1G^b$ | $1G^b$ | $1G^b$ | $1H^c$ | $1H^c$ | $1H^c$ |
| wt. percent | 30 | 20 | 20 | 25 | 20 | 20 |
| Polymer C; | | | | | | |
| Type | — | EOS-1 | SEOS-1 | — | ES-1 | SES-1 |
| wt. percent | 0 | 5 | 5 | 0 | 5 | 5 |
| Blend Method | $MB^1$ | $MB^1$ | $MB^1$ | $EB^3$ | $EB^3$ | $EB^3$ |

TABLE 3-continued

| | Blend Designation | | | | | |
|---|---|---|---|---|---|---|
| | A* | B* | C | D* | E* | F |
| PROPERTIES | | | | | | |
| Min. $^d$, μm | 0.37 | 0.22 | 0.21 | 0.24 | 0.25 | 0.25 |
| Max. $^e$, mm | 10.46 | 5.23 | 5.02 | 5.36 | 6.43 | 5.63 |
| Mean$^f$ | 2.84 | 1.13 | 1.37 | 1.72 | 1.80 | 1.55 |

TABLE 3-continued

| | Blend Designation | | | | | |
|---|---|---|---|---|---|---|
| | A* | B* | C | D* | E* | F |
| $D_{43}$g | 6.5 | 2.86 | 2.68 | 3.28 | 3.54 | 3.74 |
| Polydisp.h | 2.29 | 2.53 | 1.96 | 1.91 | 1.97 | 2.41 |

*Not an example of the present invention.
aPolyamide (Nylon 6).
bPolypropylene.
cLinear Low Density Polyethylene.
dMinimum diameter.
eMaximum diameter.
fMean Diameter.
gThe volume average particle diameter determined by measuring the particle size by scanning electron microscopy and quantitizing particle size. The volume average particle size was determined using the following euation: $D_{43} = [\Sigma N_i D_i^4]/[\Sigma N_1 D_1^3]$ where $D_1$ is the diameter of the ith particle.
h$D_{43}$/mean.
iMelt blend.
jExtrusion blend.

TABLE 4

| | Blend Designation | | | | | | |
|---|---|---|---|---|---|---|---|
| | A* | B* | C | D* | E* | F | G |
| BLEND COMPOSITION | | | | | | | |
| Polymer A; | | | | | | | |
| Type | 1Fa | 1Fa | 1Fa | 1Fa | | 1Fa | 1Fa |
| wt. percent | 70 | 75 | 75 | 75 | 75 | 75 | 90 |
| Polymer B; | | | | | | | |
| Type | 1Gb | 1Gb | 1Gb | 1Hc | 1Hc | 1Hc | — |
| wt. percent | 30 | 20 | 20 | 25 | 20 | 20 | 0 |
| Polymer C; | | | | | | | |
| Type | — | EOS-1 | SEOS-1 | — | ES-1 | SES-1 | SEOS-2 |
| wt. percent | 0 | 5 | 5 | 0 | 5 | 5 | 10 |
| Blend Method | MBa | MBa | MBa | EBb | EBb | EBb | EBb |
| PROPERTIES | | | | | | | |
| Tensile Modulus MPa | 2620 | 2551 | 2482 | 2172 | 2344 | 2310 | 2620 |
| Yield Stress MPa | 49.6 | 55.8 | 51.7 | 52.4 | 54.5 | 52.4 | 62.1 |
| Yield Strain, percent | 3.1 | 3.6 | 3.7 | 3.8 | 3.7 | 3.9 | 4 |
| Fracture Stress MPa | 46.9 | 52.4 | 48.9 | 29.6 | 46.2 | 24.1 | 56.5 |
| Elongation at Fracture, percent | 6 | 5.9 | 8 | 16.3 | 9.4 | 13.3 | 9.8 |
| Fracture Energy J | 1691 | 1837 | 2552 | 5203 | 3073 | 4276 | 3756 |
| Dynatup, J | 2.3 | 1.5 | 2.0 | 1.5 | 1.8 | 41.6 | 5.2 |
| Izod Impact J/m | 74.7 | 38.4 | 58.7 | 48.0 | 48.0 | 85.4 | 78.5 |
| Dynatup, Max. Load Kg | 52.2 | 61.2 | 100.2 | 60.3 | 69.4 | 512.6 | 196.9 | aMelt blend.
bExtrusion blend.

The data in Tables 3 and 4 show that the sulfonated interpolymers act as a compatibilizer for the blend of Nylon with polypropylene or LLDPE. The blend with sulfonated interpolymers have small particular size and better toughness than the blends without sulfonated interpolymers. For example, in the Nylon/PP blend the sample with sulfonated interpolymer (blend C) shows smaller mean diameter of PP particular size, higher fracture energy, and higher maximum load in Dynatup test than blend A (without sulfonated interpolymer). Similarly, in the Nylon LLPE blend, the addition of sulfonated interpolymer reduces the mean particular size of LLDPE and increases the maximum load in Dynatup test (comparison of Blend D and Blend F). The unmodified interpolymer may also act as a compatibilizer but it is less effective than sulfonated interpolymer

EXAMPLE 2

A. Preparation of Etylene/Styrene Copolymer (52 wt. (22.6 mole) Percent Styrene)

Reactor Description

The single reactor used was a 6 gallon (22.7 L), oil jacketed, Autoclave continuously stirred tank reactor (CSTR). A magnetically coupled agitator with Lightning A-320 impellers provides the mixing. The reactor ran liquid full at 475 psig (3,275 kPa). Process flow was in the bottom and out the top. A heat transfer oil was circulated through the jacket of the reactor to remove some of the heat of reaction. After the exit from the reactor was a micromotion flow meter that measured flow and solution density. All lines on the exit of the reactor were traced with 50 psi (344.7 kPa) steam and insulated.

Procedure

Ethylbenzene solvent was supplied to the mini-plant at 30 psig (207 kPa). The feed to the reactor was measured by a Micro-Motion mass flow meter. A variable speed diaphragm pump controlled the feed rate. At the discharge of the solvent pump a side stream was taken to provide flush flows for the catalyst injection line (1 lb/hr (0.45 kg/hr)) and the reactor agitator (0.75 lb/hr ( 0.34 kg/ hr)). These flows were measured by differential pressure flow meters and controlled by manual adjustment of micro-flow needle valves. Uninhibited styrene monomer was supplied to the mini-plant at 30 psig (207 kPa). The feed to the reactor was measured by a Micro-Motion mass flow meter. A variable speed diaphragm pump controlled the feed rate. The styrene streams was mixed with the remaining solvent stream. Ethylene was supplied to the mini-plant at 600 psig (4,137 kPa). The ethylene stream was measured by a Micro-Motion mass low meter just prior to the Research valve controlling flow. A Brooks flow meter/controllers was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was dropped to ~5° C. by an exchanger with −5° C. glycol on the jacket. This stream entered the bottom of the reactor. The three component catalyst system and its solvent flush also enter the reactor at the bottom but through a different port than the monomer stream. Preparation of the catalyst components took place in an inert atmosphere glove box. The diluted components were put in nitrogen padded cylinders and charged to the catalyst run tanks in the process area. From these run tanks the catalyst was pressured up with piston pumps and the flow was measured with Micro-Motion mass flow meters. These streams combine with each other and the catalyst flush solvent just prior to entry through a single injection line into the reactor.

Polymerization was stopped with the addition of catalyst kill (water mixed with solvent) into the reactor product line after the micromotion flow meter measuring the solution density. Other polymer additives can be added with the catalyst kill. A static mixer in the line provided dispersion of the catalyst kill and additives in the reactor effluent stream. This stream next entered post reactor heaters that provide additional energy for the solvent removal flash. This flash occurred as the effluent exited the post reactor heater and the pressure was dropped from 475 psig (3,275 kPa) down to ~250 mm of pressure absolute at the reactor pressure control valve. This flashed polymer entered a hot oil jacketed devolatilizer. Approximately 85 percent of the volatiles were removed from the polymer in the devolatilizer. The volatiles exit the top of the devolatilizer. The stream was condensed and with a glycol jacketed exchanger, entered the suction of a vacuum pump and was discharged to a glycol jacket solvent and styrene/ethylene separation vessel. Solvent and styrene were removed from the bottom of the vessel and ethylene from the top. The ethylene stream was measured with a Micro-Motion mass flow meter and analyzed for composition. The measurement of vented ethylene plus a calculation of the dissolved gasses in the solvent/styrene stream were used to calculate the ethylene conversion. The polymer separated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

Catalysts Employed

| Titanium Compound | Boron Compound[b] Boron/Ti Ratio | MMAO[c] Al/TI Ratio |
|---|---|---|
| Type 1[d] | 1.25:1 | 10:1 |

[a]dimethyl[N-(1,1-dimethylethyl)-1,1-dimethyl-1-[(1,2,3,4,5- eta.)- 1,5,6,7-tetrahydro-3-phenyl-s-

Reactor Data

| | Reactor Temp. | Solv. Flow | | Ethylene Flow | | Hydrogen Flow | Styrene Flow | | Vent Conv. |
|---|---|---|---|---|---|---|---|---|---|
| | ° C. | lb/hr | kg/hr | lb/hr | kg/hr | SCCM | lb/hr | kg/hr | % |
| ES-2 | 86.4 | 28.3 | 12.84 | 2.5 | 1.13 | 17 | 10.5 | 4.76 | 92.4 |

The resultant ethylene/styrene interpolymer contained 52.4 wt. percent (22.9 mole percent)styrene (total); 52.0 wt. percent (22.6 mole percent) in the interpolymer; 1 wt. percent atactic polystyrene; a melt index, $I_2$ of 1.0 and an $I_{10}/I_2$ ratio of 7.5.

B. Sulfonation of Copolymer
1. No Sulfonation (0 Percent Sulfonation)
2. 0.37 wt. Percent Sulfonation 100.0 g of ethylene-styrene copolymer (52 wt. percent styrene, 1.0 MI) prepared in (A) above was dissolved in 600 mL of 1,2-dichloroethane in a 1000-mL 4-neck flask equipped with a mechanical stirrer, reflux condenser, and a thermocouple. The mixture was heated to 60° C. for 2 hours until all of the polymer dissolved. In a separate flask, 100 mL of dichloroethane (Aldrich, 99 percent) and 8.7 g of acetic anhydride (0.085 mol) (Aldrich) were mixed. The solution was cooled in an ice-water bath, and 5.5 g of concentrated sulfuric acid (0.0532 mole) was added dropwise to the solution. The acetyl sulfate solution was then added to the dissolved ethylene-styrene polymer solution and the mixture turned purple and then brown. The reaction was stirred at 60° C. for 2 hours.
3. 2.3 Weight Percent Sulfonation The same procedure as was used for 2 was employed, however 17.8 g of acetic anhydride (0.175 mole) and 11.3 g concentrated sulfuric acid (0.1095 mole) were used in the sulfonation reaction. The neutralization was performed as described in part C using 14.4 g (0.0657 mole) of zinc acetate-dihydrate (Aldrich).
4. 3.2 Weight Percent Sulfonation The same procedure as was used for 2 was employed, however 35.7 g of acetic anhydride (0.35 mole) and 22.6 g of concentrated sulfuric acid (0.219 mole) were used in the sulfonation reaction. The neutralization was performed as described in part C using 36.0 (0.16 mole) of zinc acetate-dihydrate.

C. Conversion to Zinc Salt

After the sulfonation reaction (B) was complete, 14.4 g (0.0657 mol) of zinc acetate-dihydrate (Aldrich) dissolved in 60 mL of methanol was added. The solution turned white, and was stirred at 60° C. for 30 minutes longer. The solution was removed from the heat, and the polymer was isolated via precipitation from methanol in a Waring Blender. The polymer was isolated and washed repeatedly with methanol. The polymer was filtered and dried in a vacuum oven at 80° C. for 24 hours.

Various properties were determined on the unsulfonated copolymer and the sulfonated copolymers. The results are given in Table 5.

TABLE 5

| Run | Sulfonation wt. percent | UST[b] (TMA) ° C. | Tg[c] (DSC) ° C. | $G^1$ 20° C. | 180° C. |
|---|---|---|---|---|---|
| 1* | 0 | 41 | −3.2 | $5 \times 10^6$ | $1 \times 10^4$ |
| 2 | 0.37 | 102 | −13.1 | $6 \times 10^6$ | $1 \times 10^6$ |
| 3 | 2.3 | 172 | −7.7 | $1 \times 10^1$ | $1 \times 10^6$ |
| 4 | 3.2 | >190 | 2.8 (weak)[d] | $1 \times 10^8$ | $1 \times 10^7$ |

*Not an example of the present invention.
[a]The total weight percent of sulfonation (—SO$_3$H) in the sample as determined by x-ray fluorescence.
[b]Upper service temperature determined by thermomechanical analysis.
[c]Glass transition temperature determined by differential scanning calorimetry.
[d]Weak means the intensity of the Tg transition was reduced significantly compared to the unsulfonated sample.

As shown in Table 5, the zinc salts of the sulfonated ethylene/styrene copolymers show a substantial increase in heat resistance relative to the unsulfonated polymer. The upper surface temperature, as measured by the temperature upon which the TMA probe shows a penetration of 1 MM, increases substantially upon sulfonation. This increase allows the sulfonated polymers to be used in high heat elastomer applications. The heat resistance is further indicated by the comparison of the G' values for the polymers at 20° C. and 180° C. The unsulfonated polymer displays a significant drop in modulus upon increasing the temperature from 20° C. to 180° C., while the sulfonated ionomers show little decrease in plateau modulus. The most preferred level of sulfonation for use in high heat elastomer applications is between 0.2 and 2.5 wt. percent. These samples show little change in plateau modulus compared to the unsulfonated sample, yet show significant improvement in the temperature resistance.

EXAMPLE 3

Reactor Description

The single reactor used was a 6 gallon (22.7 L), oil jacketed, Autoclave continuously stirred tank reactor (CSTR). A magnetically coupled agitator with Lightning A-320 impellers provides the mixing. The reactor ran liquid full at 475 psig (3,275 kPa). Process flow was in the bottom and out the top. A heat transfer oil was circulated through the jacket of the reactor to remove some of the heat of reaction. After the exit from the reactor was a micromotion flow meter that measured flow and solution density. All lines on the exit of the reactor were traced with 50 psi (344.7 kPa) steam and insulated.

Procedure

Ethylbenzene solvent was supplied at 30 psig (207 kPa). The feed to the reactor was measured by a Micro-Motion mass flow meter. A variable speed diaphragm pump controlled the feed rate. At the discharge of the solvent pump a side stream was taken to provide flush flows for the catalyst injection line (1 lb/hr (0.45 kg/hr)) and the reactor agitator (0.75 lb/hr ( 0.34 kg/hr)). These flows were measured by differential pressure flow meters and controlled by manual adjustment of micro-flow needle valves. Uninhibited styrene monomer was supplied at 30 psig (207 kPa). The feed to the reactor was measured by a Micro-Motion mass flow meter. A variable speed diaphragm pump controlled the feed rate. The styrene streams was mixed with the remaining solvent stream. Ethylene was supplied at 600 psig (4,137 kPa). The ethylene stream was measured by a Micro-Motion mass flow meter just prior to the Research valve controlling flow. A Brooks flow meter/controllers was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was dropped to ~5° C. by an exchanger with −50° C. glycol on the jacket. This stream entered the bottom of the reactor. The three component catalyst system and its solvent flush also enter the reactor at the bottom but through a different port than the monomer stream. Preparation of the catalyst components took place in an inert atmosphere glove box. The diluted components were put in nitrogen padded cylinders and charged to the catalyst run tanks in the process area. From these run tanks the catalyst was pressured up with piston pumps and the flow was measured with Micro-Motion mass flow meters. These streams combine with each other and the catalyst flush solvent just prior to entry through a single injection line into the reactor.

Polymerization was stopped with the addition of catalyst kill (water mixed with solvent) into the reactor product line after the micromotion flow meter measuring the solution density. Other polymer additives can be added with the catalyst kill. A static mixer in the line provided dispersion of the catalyst kill and additives in the reactor effluent stream. This stream next entered most reactor heaters that provide additional energy for the solvent removal flash. This flash occurred as the effluent exited the post reactor heater and the pressure was dropped from 475 psig (3,275 kPa) down to ~250 mm of pressure absolute at the reactor pressure control valve. This flashed polymer entered a hot oil jacketed devolatilizer. Approximately 85 percent of the volatiles were removed from the polymer in the devolatilizer. The volatiles exit the top of the devolatilizer. The stream was condensed and with a glycol jacketed exchanger, entered the suction of a vacuum pump and was discharged to a glycol jacket solvent and styrene/ethylene separation vessel. Solvent and styrene were removed from the bottom of the vessel and ethylene from the top. The ethylene stream was measured with a Micro-Motion mass flow meter and analyzed for composition. The measurement of vented ethylene plus a calculation of the dissolved gasses in the solvent/styrene stream were used to calculate the ethylene conversion. The polymer separated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopped into pellets with a strand chopper.

| Catalysts Employed | | | | |
|---|---|---|---|---|
| | Titanium | Boron Compound | | MMAO[e] |
| | Compound Type | Type | Boron/Ti Ratio | Al/TI Ratio |
| ES-3 | A[a] | I[d] | 3.51:1 | 6:1 |
| ES-4 | A[a] | II[b] | 1.24:1 | 10:1 |

[a]dimethyl[N-1(1,1-dimethylethyl)-1,1-dimethyl-1-[(1,2,3,4,5-.eta.)-1,5,6,7-tetrahydro-3-phenyl-s-indacen-1-yl]silanaminato(2-)-N]-titanium
[b]bis-hydrogenated tallowalkyl methylammonium tetrakis (pentafluorophenyl)borate.
[c]a modified methylaluminoxane commercially available from Akzo Nobel as MMAO-3A.
[d]tris(pentafluorophenyl)borane.

| Reactor Data | | | | | | | | |
|---|---|---|---|---|---|---|---|---|
| | Reactor Temp. | Solv. Flow | | Ethylene Flow | | Hydrogen Flow | Styrene Flow | | Vent Conv. |
| | ° C. | lb/hr | kg/hr | lb/hr | kg/hr | SCCM | lb/hr | kg/hr | % |
| ES-3 | 79 | 41 | 18.6 | 2.18 | 9.9 | 3.2 | 21.0 | 10.5 | 96.97 |
| ES-4 | 86 | 28.3 | 1.29 | 2.48 | 1.13 | 17.0 | 10.5 | 5.25 | 92.28 |

The ethylene/styrene interpolymers had the following properties.

| | Styrene[a] Percent | | Ethylene[a] Percent | | Total Styrene[b] weight | aPS[c] weight | Den. | Melt Index | |
|---|---|---|---|---|---|---|---|---|---|
| | wt | mol | wt. | Mol | percent | percent | g/cc | $I_2$ | $I_{10}/I_2$ |
| ES-3 | 72 | 41 | 28 | 59 | 73 | 3 | 0.99 | 1.0 | 8.95 |
| ES-4 | 52 | 22.6 | 48 | 77.4 | 52.4 | 1 | 0.95 | 1.0 | 7.61 |

[a]amount of component in copolymer.
[b]amount of styrene in copolymer + the amount of styrene in atactic polystyrene.
[c]amount of atactic polystyrene in polymerization product.

B. Sulfonation of ES-3

200.0 grams of ESI pellets (cylindrical pellets 3 mm in height and 1.5 mm in diameter of an ethylene/styrene copolymer containing 72 percent Styrene with 3 percent aPS and having a 1.0 $I_2$ MI) were loaded into a 1,000 mL, 4-neck glass reaction kettle equipped with a stainless steel mechanical stirrer, a pressure gauge, a thermometer and an outlet port which is connected to a vacuum/gas manifold. The reaction kettle was flushed with nitrogen, then it was evacuated to 25 torr. In a separate glass vessel, a 20 percent solution of gaseous sulfur trioxide in nitrogen was prepared. The sulfur trioxide was generated by heating fuming sulfuric acid (30 percent Oleum-purchased from Aldrich Chemical Co) to 95° C., and collecting the sulfur trioxide vapor that is produced. The mechanical stirrer in the reaction kettle was started and run at sufficient rate such that rapid turnover of the polymer pellets was achieved. The sulfur trioxide/nitrogen mixture was slowly transferred to the reaction kettle via metering through a needle valve while monitoring the vapor pressure in the reaction vessel. In this example, the sulfur trioxide mixture was bled into the reaction mixture until 0.50 g (6.25 mmol) of sulfur trioxide had been delivered. After addition of the sulfur trioxide, the reaction was stirred for 1 minute, then the reaction chamber was evacuated. Following evacuation of the chamber, the sulfonated ESI pellets were flushed repeatedly with nitrogen.

C. Neutralization of Sulfonated ES-3 from B

The pellets from example 3B were neutralized by bleeding ammonia gas into the evacuated reaction chamber. This was accomplished by evacuating the reaction vessel to 25 torr following sulfonation. Then ammonia gas was bled into the reaction chamber until a pressure on about 500 torr was observed (large excess of ammonia). The neutralization is instantaneous, and after about 5 seconds, the chamber is re-evacuated and flushed with nitrogen. The $SO_3NH_4^+$ content of the ESI pellets was determined by x-ray fluorescence and was found to be 2200 ppm.

D. Sulfonation and Neutralization of ES-3

In this example, 200 grams of ESI pellets (ES-3: 72 weight percent Styrene, 3 weight percent aPS, 1.0 $I_2$ MI) were sulfonated as described in example 3B, except the sulfur trioxide mixture was bled into the reaction chamber until 0.20 g (2.5 mmol) had been delivered. This sample was neutralized with ammonia as described in example 3C. The $SO_3NH_4^+$ content of the ESI pellets was determined by x-ray fluorescence and was found to be 610 ppm.

E. Sulfonation and Neutralization of ES-4

In this example, 200 grams of ESI pellets (ES-4 52 weight percent styrene, 1.0 weight percent aPS, 1.0 $I_2$ MI) were sulfonated as described in example 3B. This sample was neutralized with ammonia as described in example 3C. The $SO_3NH_4^+$ content of the ESI pellets was determined by x-ray fluorescence and was found to be 1200 ppm.

F. Sulfonation of ES-3

In this example, 200 grams of ESI pellets (ES-3 72 weight percent styrene, 3 weight percent aPS, 1.0 $I_2$ MI) were sulfonated as described in example 3B except the sulfur trioxide mixture was bled into the reaction chamber until 0.20 g (2.5 mmol) had been delivered. Following sulfonation, the un-neutralized pellets were removed from the reaction chamber and poured into a 1M solution of Zinc Acetate in water. After 30 seconds, the pellets are isolated by filtration and dried in a vacuum oven. The —$SO_3Zn$ content of the ESI pellets was determined by x-ray fluorescence and was found to be 450 ppm.

G. Sulfonation and Neutralization of ES-3

In this example, 200 grams of ESI pellets (ES-3: 72 weight percent styrene, 3 weight percent aPS, 1.0 MI) were sulfonated as described in example 3B, except the sulfur trioxide mixture was bled into the reaction chamber until 0.20 g (2.5 mmol) had been delivered. This sample was neutralized with ammonia as described in example 3C. The $SO_3NH_4^+$ content of the ESI pellets was determined by x-ray fluorescence and was found to be 16 ppm.

The blocking tendency of various samples were investigated using the pellet blocking method described in the Test Method section. Talc (Microtalc MP 12-50-Specialty Minerals Inc) was dry added to the pellets and shaken in a 250 mL glass jar. Surface sulfonation was found to significantly reduce the blocking tendency of the polymer pellets.

The results are given in Table 6.

TABLE 6

| Sample | Amount of Styrene in Copolymer wt | Amount of Styrene in Copolymer mole | $-SO_3^-M^{+}$ ppm | $-SO_3^-M^{+}$ mol percent | Counter Ion "M" | Talc ppm | Force Required to Break lb | Force Required to Break kg |
|---|---|---|---|---|---|---|---|---|
| Example 3C | 72 | 41 | 2200 | 0.13 | $NH_4^+$ | 2000 | 6.4 | 2.9 |
| unsulfonated ES-3* | 72 | 41 | 0 | 0 | — | 2000 | >100 | >45.4 |
| Example 3D | 72 | 41 | 610 | 0.037 | $NH_4^+$ | 5000 | 7.7 | 3.5 |
| Example 3F | 72 | 41 | 490 | 0.029 | $Zn^{2+}$ | 5000 | 14.3 | 6.49 |
| unsulfonated ES-3* | 72 | 41 | 0 | 0 | — | 5000 | 29.1 | 13.2 |
| Example 3E | 52 | 23 | 1200 | 0.063 | $NH_4^+$ | 5000 | 7.2 | 3.3 |
| unsulfonated ES-4* | 52 | 23 | 0 | 0 | $NH_4^+$ | 5000 | >100 | >45.4 |

*Not an example of the present invention.
**Mole percent of the mer units containing a $-SO_3^-M^+$ group in total polymer.

The data in Table 6 shows that surface sulfonation can be used to reduce the blocking tendency of polymer pellets.

Contact Angle Measurements

The water wettability of surface sulfonated ESI samples was evaluated by measuring the contact angle between water and sulfonated ESI plaques. Surface sulfonation was found to significantly improve the water wettability of the samples.

TABLE 7

| Sample | Percent $-SO_3^-M^{+*}$ ppm | Percent $-SO_3^-M^{+*}$ mole | Water Contact Angle (pH 7) |
|---|---|---|---|
| unsulfonated ESI-4 | 0 | 0 | 92° |
| Example 3C | 2200 | 0.13 | 18° |
| Example 3D | 610 | 0.037 | 15° |
| Example 3G | 16 | 0.001 | 76° |

*Mole percent of the polymer units containing a $-SO_3^-M^+$ group in total polymer.

It is apparent from this data that very low levels of sulfonation (16 ppm) can have an effect on the ability of water to wet the surface of ESI samples. This increase in surface polarity should result in better paintability, improved glass and metal adhesion, and increased resistance to gasoline and other organic solvents.

X-Ray Photoelectron Spectroscopy (XPS)

The sulfonated ESI pellets were examined by XPS to verify that the sulfonation only occurs at the surface of the ESI pellets and plaques. The outside surface of individual pellets from Example 1B were examined. The pellets were then cut in half and the inside core of the pellets were looked at by XPS.

TABLE 8

| | XPS Concentration in Atomic Percent (mole percent) | | | | |
|---|---|---|---|---|---|
| Sample | Carbon | Oxygen | Sulfur $-SO_3^-M^{+*}$ | Nitrogen | Fluorine |
| Example 3C (Surface) | 40.4 | 32.5 | 9.2 (42.9) | 15.7 | 1.6 |
| Example 3C (Inside) | 99.5 | 0.5 | 0 (0) | 0 | 0 |

*Mole percent of the mer units containing a $-SO_3^-M^{+*}$ group in total polymer.

These results show that the sulfonation is occurring predominately at the surface of the ESI pellets. It also appears that there is a slight contamination for the TEFLON grease that was used to seal the reaction kettle of the reactor.

What is claimed is:

1. A sulfonated substantially random interpolymer comprising (1) from 1 to 65 mole percent of polymer units derived from styrene;

(2) from 35 to 99 mole percent of polymer units derived from ethylene, propylene, butene-1, hexene-1, pentene-1, octene-1 or any combination thereof, and wherein said sulfonated interpolymer contains from 0 1 to 65 mole percent of one or more groups represented by the formula $-SO_3^-M$ where M is hydrogen, $NH_4^+$, $Li^+$, $Na^+$, $K^+$, $Mg^{++}$, or $Zn^{++}$.

2. The sulfonated substantially random interpolymer of claim 1 which comprises (i) from 1 to 50 mole percent of polymer units derived from component (1);

(ii) from 50 to 99 mole percent of polymer units derived from component (2); and (iii) said polymer contains from 0 5 to 50 mole percent of the group represented by the formula $-SO_3^-M$.

3. The sulfonated substantially random interpolymer of claim 1 which comprises (i) from 1 to 10 mole percent of polymer units derived from component (1);

(ii) from 50 to 99 mole percent of polymer units derived from component (2), and (iii) said polymer contains 0 5 to 10 mole or percent of the group represented by the formula $-SO_3^-M$.

4. The sulfonated substantially random interpolymer of claim 1, wherein the interpolymer comprises a sulfonated aromatic ring.

5. The sulfonated substantially random interpolymer of claim 1, wherein the interpolymer comprises a sulfonated polymer backbone.

6. The sulfonated substantially random interpolymer of claim 1, comprising (i) from 1 to 50 mole percent of polymer units derived from component (1);

(ii) from 50 to 99 mole percent of polymer units derived from component (2); and (iii) said polymer contains from 0 1 to 10 mole percent of the group represented by the formula $-SO_3^-M$.

7. A sulfonated substantially random interpolymer comprising
   (1) from 1 to 65 mole percent of polymer units derived from styrene;
   (2) from 35 to 99 mole percent of polymer units derived from ethylene, propylene, butene-1, hexene-1, pentene-1, octene-1 or any combination thereof; and wherein said sulfonated interpolymer contains from 0 001 to 30 mole percent of one or more groups represented by the formula —$SO_3^-M$ where M is hydrogen, $NH_4^+$, $Li^+$, $Na^+$, $K^+$, $Mg^{++}$, or $Zn^{++}$.

* * * * *